No. 805,677.

PATENTED NOV. 28, 1905.

F. L. SMITH.

VALVE.

APPLICATION FILED JULY 18, 1904.

Witnesses:

H. S. Gaither

Fred G. Fischer

Inventor:

Frank L. Smith by Burton & Burton

Attorneys

UNITED STATES PATENT OFFICE.

FRANK L. SMITH, OF CHICAGO, ILLINOIS, ASSIGNOR OF ONE-THIRD TO ALVA C. RICKSECKER AND ONE-THIRD TO LEWIS A. NICHOLS, OF CHICAGO, ILLINOIS.

VALVE.

No. 805,677. Specification of Letters Patent. Patented Nov. 28, 1905.

Application filed July 18, 1904. Serial No. 216,936.

*To all whom it may concern:*

Be it known that I, FRANK L. SMITH, a citizen of the United States, residing at No. 215 East Sixty-fifth Place, Chicago, in the county of Cook and State of Illinois, have invented new and useful Improvements in Valves, of which the following is a specification, reference being had to the accompanying drawings, forming a part thereof.

The purpose of this invention is to provide an improved form of construction of valves and valve-disks.

It consists in the features of construction set out in the claims.

Figure 1:
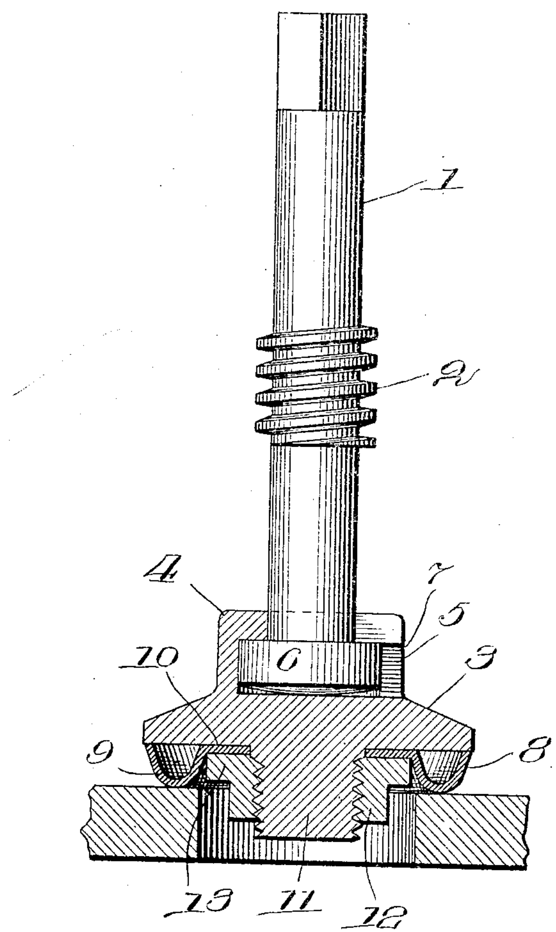
Figure 2:
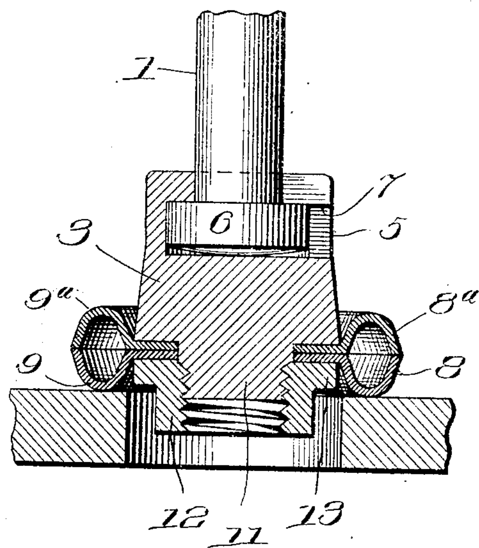

In the drawings, Figure 1 is a partly-sectional side elevation of my improved valve. Fig. 2 is a similar view showing a modified construction.

The valve-stem 1 is shown as of a form familiar and is provided with a thread 2 for engagement with the valve-body to smooth the valve down to its seat. The stem 1 may be engaged with the valve-head 3 in any well-known manner for accommodation. For this purpose I provide the valve-head 3 with a hub or boss 4 at the back, having a cavity 5 leading in from one side, into which cavity a flange-terminal 6 of the stem is introduced and held in place in the valve-head 3 by the inner marginal flange 7, formed on the hub or boss 4 and overhanging the cavity 5 and flange-terminal 6.

Upon the face of the head of the valve toward the valve-seat a metal disk 8 is lodged, as hereinafter described, such disk forming the seating-face of the valve and being intended to be used instead of the rubber or asbestos rings sometimes employed to form a yielding or accommodating face. The disk 8 is preferably made of copper or other relatively soft metal, which while effective for the purpose indicated does not tend materially to cut away the seat on which the disk is forced. The disk 8 is provided with an arched or concavo-convex annular portion 9, which encompasses a portion 10 within said annular concavo-convex portion, which is provided with a central aperture and adapted for binding the disk to the valve-head. To lodge the disk 8 securely but detachably on the face of the valve-head 3 and hold it firmly in its proper place, the valve-head 3 is provided at its center with a threaded boss 11, which at its junction with the valve-head 3 is of a diameter equal to that of the central aperture in the encompassed portion of the disk 8, thus centering the disk 8 on the valve-head 3. The nut 12, which is screwed onto the threaded boss 11, is provided with a peripheral flange 13, whose diameter is equal to the inner diameter of the concavo-convex annulus 9, and the nut 12 when seated presses upon the portion of the disk 8, encompassed by the annulus 9, binding the disk 8 firmly to the face of the valve-head 3 and also centering it thereon. The valve can thus at any time be quickly and cheaply repaired, involving only the cost of a new disk.

The modification shown in Fig. 2 presents several advantages in the reversibility of the disks 8 and $8^a$ and in the ability of the said disks by being mounted on the valve-head 3 with the concave faces of their respective annular portions facing each other to sustain a very high pressure without crushing or distorting the arched or concavo-convex annular portions 9 and $9^a$, respectively. Any slight yielding back of the two disks outside the area at which they are supported on the head which may occur when relatively soft metal is employed for the disks may be corrected and the disks straightened by transposing or reversing them, thus also bringing into service a new seating-face for the same high pressure, which would cause such yielding of the disks in their first position as will produce like effect in the opposite direction in their new position. In this construction the valve-head 3 is reduced to a diameter equal to the inner diameter of the concavo-convex annular portions of the disk $8^a$, thus centering said disk $8^a$ on the valve-head 3, and the nut 12 will bind both said disks 8 and $8^a$ together and by means of its peripheral flange 13 center said disk 8 on said disk $8^a$ and valve-head 3.

In order to serve efficiently the purpose for which the arch or concavo-convex annular feature of the valve-disk is provided in either of the forms shown, it is practically essential for its use under high pressure for which it is especially designed that the arched annulus shall be directly supported back of the outer circumference of the arch or concavo-convex portion, as well as back of the inner circumference of such arched portion or within the inner circumference—that is, that each end of the arch, so to speak, as the same appears in cross-section should be supported, so that the value of the arch as a more or less elastic, but nevertheless very firm, means of resisting pressure may be obtained—for it will be manifest that by omitting the support at either circumference the peculiar value of the arched construction will be almost entirely lost and that which will remain will be the mere stiffness of the metal without regard to its arched form. The structure shown in Fig. 2, in which the two arches are placed back to back, meets this condition adequately up to very considerable pressure. It will also be seen that in order to realize the utmost advantage of the arched construction in respect to such elasticity as it may give to the device under high pressure it is necessary that the arch or concavo-convex annulus should be free from circumferential restraint at one or the other end of the arch—that is, at either the inner or outer circumference of the concavo-convex annulus—and preferably the circumference left thus without restraint is the outer circumference, as shown in both the figures.

The generic invention embodied in the construction shown in this application is also shown in another specific form in my Patent No. 749,637, dated January 12, 1904, for the reissue of which my application Serial No. 217,275, filed July 19, 1904, is now pending, in which said application said generic invention is claimed broadly.

I claim—

1. A valve comprising a head and a removable metal disk having a concavo-convex annular portion and a portion encompassed thereby and from which the annular portion protrudes, said disk being lodged on said head with the convex face of the protruding annulus outward; an axially-protruding threaded boss on said head and a nut having a peripheral diameter corresponding to the inner diameter of the protruding annulus at the outer face of the latter for fitting within said protruding annulus to center the latter on the head and bind the encompassed portion thereon.

2. A valve comprising a head and two removable metal disks having each an annular concavo-convex portion, said disks being mounted on said head with the concave faces of said annular portions facing each other, and their encompassed portions backed by the head, and means for binding said encompassed portions to the head.

3. A valve comprising a head and two removable metal disks having each an annular concavo-convex portion, said disks being mounted on said head with the concave faces of said annular portions facing each other, and means for binding their encompassed portions to the head; one of said disks being centered by the head and the other of said disks by said binding means.

4. A valve comprising a head and a removable metal disk having a concavo-convex annular portion lodged and secured on the head with the convex face of the annulus outward, the annulus being directly supported at both its inner and outer circumference but being free from restraint against spreading at one of its said circumferences.

5. A valve comprising a head and a removable metal disk having a concavo-convex annular portion lodged and secured on the head with the convex face of the annulus outward, the annulus being directly supported at both its inner and outer circumference but being free from restraint against spreading at the outer circumference.

In testimony whereof I have hereunto set my hand, in the presence of two witnesses, at Chicago, Illinois, this 11th day of July, 1904.

FRANK L. SMITH.

In presence of—
CHAS. S. BURTON,
FRED G. FISCHER.